United States Patent
Botts

[15] 3,648,701
[45] Mar. 14, 1972

[54] FORCEP INSTRUMENT FOR STRIPPING THE CONTENTS OF FLEXIBLE TUBES

[72] Inventor: Marion Botts, 9340 N. E. Schuyler, Portland, Oreg. 97220
[22] Filed: Nov. 24, 1969
[21] Appl. No.: 879,155

[52] U.S. Cl..................................128/321, 128/346, 251/6
[51] Int. Cl..................A61b 17/28, A61b 17/08, F16l 55/14
[58] Field of Search..................128/321, 322, 346; 81/3 R; 251/6, 9

[56] References Cited

UNITED STATES PATENTS

| | | | |
|---|---|---|---|
| 1,422,538 | 7/1922 | Cameron | 128/321 |
| 2,245,030 | 6/1941 | Gottesfeld et al. | 251/7 |
| 2,598,901 | 6/1952 | Garland | 128/346 |
| 3,452,755 | 7/1969 | Mishkin et al. | 128/321 X |

FOREIGN PATENTS OR APPLICATIONS

| | | | |
|---|---|---|---|
| 0,278,763 | 2/1952 | Switzerland | 128/321 |

*Primary Examiner*—Channing L. Pace
*Attorney*—Kolisch & Hartwell

[57] ABSTRACT

A forceplike instrument having rollers for clearing the contents of flexible tubing. The forcep comprises a pair of elongated arms pivotally joined at one set of ends and having handle loops on the other set of ends to receive the fingers of an operator's hand. Slight matching bends are formed in the arms midway of their length, and each arm is provided with a roller journaled normal to the arm length whereby a flexible tube may be gripped between the rollers when the forcep is closed. A tube restraining link extends between the outer end of one of the rollers and its arm.

4 Claims, 3 Drawing Figures

Patented March 14, 1972

3,648,701

INVENTOR
MARION BOTTS
BY Kolisch & Hartwell
ATTORNEYS 3,648,701

FORCEP INSTRUMENT FOR STRIPPING THE CONTENTS OF FLEXIBLE TUBES

BACKGROUND OF THE INVENTION

The present invention relates to a forcep-like instrument for stripping the contents of flexible tubing. More particularly the invention concerns hand-held forceps having a pair of rollers thereon which may be compressed together on either side of a flexible tube and passed lengthwise along the tube to strip its contents.

Flexible tubing of rubber or other elastomeric materials is used widely for medical purposes and it often becomes necessary to clear the contents of such tubing prior to or during its use. For example, during the delivery of materials to the human body such as occurs during intravenous feeding, it is necessary to eliminate the presence of air from the intravenous apparatus. Likewise when tubing is used for the purpose of draining fluids from the human body it is desirable to clear the tubing from time to time without dislocating it. Particularly in the latter instances it has been common in the past for a nurse to clamp the tube tightly between a thumb and forefinger of her hand while drawing the hand down the length of the tube. Such compressing of the tube was effective to propel the tube contents ahead of the constriction and thereby clear the tube.

However, with rubber or elastomeric tubing a noticeable friction is created by such hand stripping. Consequently, it is necessary that the nurse apply a lotion or lubricant to her hand to overcome the friction. Even so the use of high digital pressure involved is detrimental to the nurses hands and deters effective clearing of tubes in some instances without repeated efforts.

SUMMARY

Accordingly, it is an object of the invention to provide an improved instrument for clamping and stripping a length of flexible tubing to clear the contents thereof.

It is a further object of the invention to provide a hand-held forceps having rollers for gripping a flexible tubing, and a restraining fence to confine the tubing within the rollers as the forceps is passed along a length thereof.

The foregoing and other objects of the invention are accomplished by a novel forceps design including a pair of elongated arms pivotally joined and having a set of ends provided with loops to receive fingers of an operator's hand. Small matching angular bends are formed in the arms midway of their length to offset the operator's hand from the working portion of the instrument, along which a pair of rollers are mounted, one on each arm, to open and close with the forceps. A retaining loop is secured between the outer end of one of the rollers and its mounting arm to confine the tubing within the rollers when the instrument is closed.

BRIEF DESCRIPTION OF THE DRAWING

Other objects and advantages of the invention will be apparent from the following description taken in conjunction with the accompanying drawings, wherein.

DETAILED DESCRIPTION OF THE INVENTION

Figure 1:
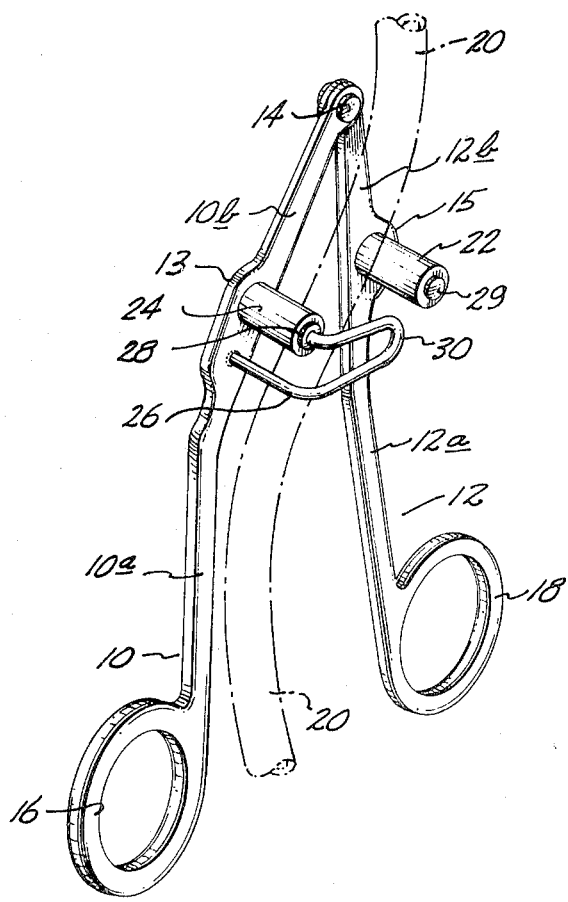
FIG. 1 is a perspective view of forceps designed in accordance with the present invention, shown in a partially open position.
Figure 2:
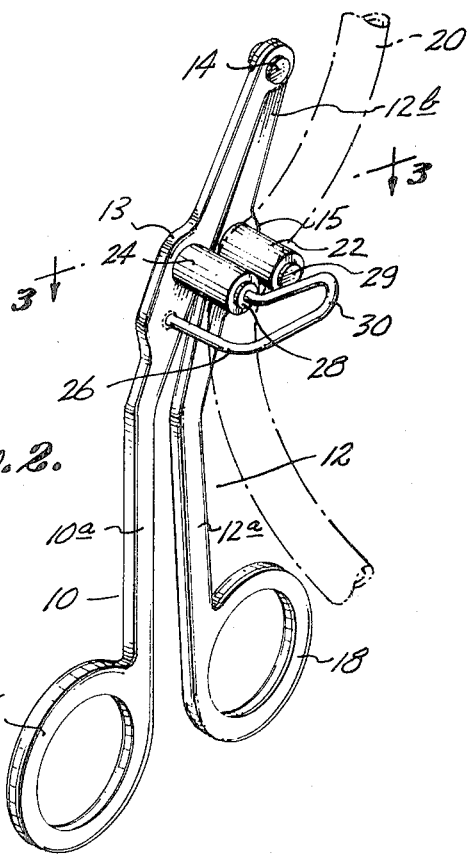
FIG. 2 is a perspective view of the forceps shown in FIG. 1 in a closed position.
Figure 3:
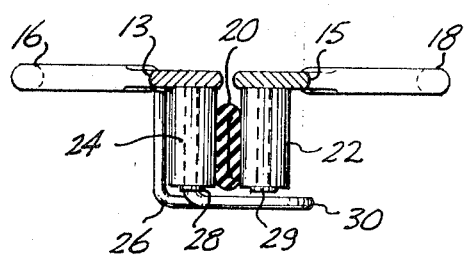
FIG. 3 is a cross sectional view taken along line 3—3 of FIG. 2.

Referring now to the drawings forceps 2 are shown with a length of tubing, pictured in dotted outline, located therein for clamping and/or stripping. The forceps generally comprises a scissor type tool including a lower pivoted arm member 10 and an upper pivoted arm member 12 joined by a suitable pivot means, in the form of a pin or rivet 14 fastened through appropriate holes formed in the arm members. If desired the holes in the arm members may be internally threaded and the members fastened together by a screw which can be adjusted to determine the force required to open and close the forcep. However, for ordinary purposes of operation it is envisioned that the forceps be closable under light hand force.

A pair of loops 16, 18 are provided respectively at the other ends of members 10, 12 by which the forceps may be gripped by a thumb and another finger of the operator's hand to be opened or closed in scissor fashion. The arm members are preferably formed of a noncorrosive metallic material and are shaped with small matching bends, about axes paralleling the pivot axis provided by pivot means 14, midway of their length, whereby arm portions 10a, 12a are disposed at slight angles with respect to portions 10b, 12b. This results in the operator's hand being slightly offset from, and non-interfering with any tubing held in the device.

Arm segments 10b, 12b are formed with slightly thickened portions 13, 15, respectively, which serve as mounting surfaces for rollers 22, 24 transversely disposed with respect to the arms. The rollers are preferably comprised of hard rubber or a cured elastomer and are rotatably journaled on pins 28, 29 fixed to the arm members. As shown, the rollers are aligned along parallel axes and are adapted to contact and depress the opposite sides of a flexible tube placed therebetween upon closure of the forceps.

A loop member or guard 26 is shown is joined at one end with the outer end of pin 28. The member has a U-shaped portion which extends between the ends of the rollers adjacent their outer ends, the member continuing in a portion which is joined to and the thickened portion 13 of the arm member 10. When a tube is clamped between the rollers this member retains the tube within the rollers at their outer ends, while the arm members prevent escape at the inner roller ends.

In operation the forceps are gripped by the operator in one hand and opened whereby a length of tubing may be inserted between the rollers through a gap 30 between member 26 and roller 22. The instrument is then oriented so that the rollers are transverse to the length of the tubing and the forceps are closed with sufficient force to compress the tube walls together. Thereupon the operator may pull the forceps along the length of tubing, applying suitable pressure to the rollers to cause the entire contents of the tubing to be forced in the direction of forceps movement and the tube thereby cleared.

It should be apparent that placement of the rollers between the finger loops and pivot is not required. Rather, the handle and rollers may be mounted on opposite sides of the pivot. However, such an arrangement is less desirable than that shown in the drawings since greater force would be required to exert the same type of leverage. Furthermore, the rollers would not be as conveniently arranged for manipulation of the forceps by the operator.

It should also be noted that the forceps described might be used for other purposes as well. For example, the pressure exerted by the rollers is sufficient that the forceps might be utilized as a tube clamp; and to this end it is alternatively possible to provide a clamping means to lock the arm members together in a closed, locked position upon a tube to achieve clamping.

It is claimed and desired to secure by Letters Patent:

1. Tube forceps comprising
  a pair of elongated arm members,
  pivot means pivotally connecting the arm members together for relative pivotal movement about a pivot axis extending transversely of the arm members at one end thereof,
  said arm members having a set of ends remote from said pivot means and said set of ends being provided with finger accommodating loops, one for each arm member, accommodating digital manipulation of the arm members in the forceps,
  first and second parallel rollers disposed in opposed relationship with the axes of the rollers extending transversely of the arm members and paralleling said pivot axis, and means journaling one roller on one arm member and the other roller on the other arm member at a location spaced between said pivot axis of said pivot means and the ends of the arm members having the loops and with a rollers held in a position projecting laterally of corresponding sides of said arm members, said rollers terminating in a set of exposed ends remote from the arm members.

2. Forceps as claimed in claim 1 wherein
said arm members have substantially matching bends intermediate their length, such bends being about axes paralleling said pivot axis, and which further includes a guard member secured to one arm member which includes a portion extending between the rollers at their exposed outer ends.

3. Tube forceps comprising
a pair of elongated arm members,
means pivotally interconnecting the arm members accommodating relative swinging about a pivot axis extending transversely of the arm members,
said arm members having a set of ends remote from said pivot axis and said set of ends having finger loops integral with the arm members at one end thereof; accommodating digital manipulation thereof, and
a pair of rollers journaled on the arm members, one on each, with axes generally paralleling said pivot axis and disposed opposite each other, said rollers being spaced along the length of the arm members from said pivot means and said loops, said rollers projecting laterally of corresponding sides of said arm members and terminating in a set of exposed ends remote from the arm members.

4. The tube forceps of claim 3, wherein the arm members have another set of ends opposite the set of ends having the finger loops, said arm members are pivotally interconnected at said other set of ends of the arm members, and said rollers are journaled on said arm members at a location disposed intermediate the first-mentioned and said other set of ends of the arm members.

* * * * *